US010933491B2

(12) United States Patent
Gäbelein et al.

(10) Patent No.: US 10,933,491 B2
(45) Date of Patent: Mar. 2, 2021

(54) LASER BEAM PROCESSING DEVICE COMPRISING A COUPLING DEVICE FOR COUPLING A FOCUSED LASER BEAM INTO A FLUID JET

(71) Applicant: AVONISYS AG, Zug (CH)

(72) Inventors: Jens Günter Gäbelein, Campo di Trens (IT); Jeroen Hribar, Lucerne (CH)

(73) Assignee: AVONISYS AG, Zug (CH)

( * ) Notice: Subject to any disclaimer, the term of this patent is extended or adjusted under 35 U.S.C. 154(b) by 179 days.

(21) Appl. No.: 15/780,705

(22) PCT Filed: Nov. 30, 2016

(86) PCT No.: PCT/EP2016/079305
§ 371 (c)(1),
(2) Date: Jun. 1, 2018

(87) PCT Pub. No.: WO2017/093331
PCT Pub. Date: Jun. 8, 2017

(65) Prior Publication Data
US 2018/0354072 A1    Dec. 13, 2018

(30) Foreign Application Priority Data

Dec. 2, 2015 (DE) .................... 10 2015 224 115.7

(51) Int. Cl.
*B23K 26/14* (2014.01)
*B23K 26/142* (2014.01)
(Continued)

(52) U.S. Cl.
CPC ........ *B23K 26/1476* (2013.01); *B23K 26/142* (2015.10); *B23K 26/146* (2015.10); *B23K 26/1436* (2015.10); *B23K 26/16* (2013.01)

(58) Field of Classification Search
CPC .. B23K 26/1476; B23K 26/142; B23K 26/16; B23K 26/146; B23K 26/1436
(Continued)

(56) References Cited

U.S. PATENT DOCUMENTS 3,503,804 A * 3/1970 Schneider ............ B23K 26/144
                                                134/1
3,597,578 A * 8/1971 Sullivan ................ B23K 26/10
                                               219/121.67
(Continued)

FOREIGN PATENT DOCUMENTS

EP         1833636 B1    7/2010
JP       2013180308 A    9/2013
(Continued)

OTHER PUBLICATIONS

International Search Report for Application No. PCT/EP2016/079305, dated Feb. 8, 2017.

*Primary Examiner* — Eric S Stapleton
(74) *Attorney, Agent, or Firm* — Marshall, Gerstein & Borun LLP (57) ABSTRACT

Disclosed is a laser beam processing device, the main part of which is a coupling device (1) for coupling a focused laser beam (2) into a fluid jet (3) of a defined cross-section. The coupling device (1) comprises a housing (4), in which a fluid nozzle is configured for forming the fluid jet (3). In addition, an outlet opening (6) is provided in the housing, through which the fluid jet (3) exits from the housing (4) and the cross-section of which is larger than the cross-section of the fluid jet (3). A passage chamber is provided between the fluid nozzle (5) and the outlet opening (6) for the fluid jet (3). According to the invention, a throttle bore is provided, which connects the passage chamber (7) to the pressure chamber and is dimensioned in relation to the outlet opening so that, in the region of the passage chamber which is
(Continued)

arranged about the fluid nozzle (5), there is a pressure that is smaller than the pressure in the pressure chamber so that an overpressure does not form in the passage chamber with respect to the pressure in the pressure chamber. In addition, a method is disclosed for setting a pressure in the passage chamber (7) in a coupling device of this type, in which the pressure does not exceed the pressure in the pressure chamber.

5 Claims, 5 Drawing Sheets

(51) Int. Cl.
*B23K 26/146* (2014.01)
*B23K 26/16* (2006.01)

(58) Field of Classification Search
USPC .......................................... 219/243
See application file for complete search history.

(56) References Cited

U.S. PATENT DOCUMENTS

| | | | | | |
|---|---|---|---|---|---|
| 3,612,814 | A * | 10/1971 | Houldcroft | ............ | B23K 26/10 219/121.67 |
| 3,679,863 | A * | 7/1972 | Houldcroft | .......... | B23K 26/364 219/121.72 |
| 3,742,182 | A * | 6/1973 | Saunders | ........... | B23K 26/0661 219/121.71 |
| 4,125,757 | A * | 11/1978 | Ross | ....................... | B23K 26/14 219/121.67 |
| 4,251,709 | A * | 2/1981 | Schumacher | ...... | B23K 15/0073 219/121.14 |
| 4,497,692 | A * | 2/1985 | Gelchinski | ............. | C25D 5/026 205/92 |
| 4,500,770 | A * | 2/1985 | Vock | ...................... | A24C 5/606 219/121.7 |
| 4,689,467 | A * | 8/1987 | Inoue | ..................... | B23K 10/00 219/121.6 |
| 4,766,009 | A * | 8/1988 | Imura | ....................... | C23F 1/02 216/37 |
| 4,798,931 | A * | 1/1989 | Hess, III | ............. | B23K 26/1435 219/121.64 |
| 4,859,826 | A * | 8/1989 | Hess, III | ................. | B23K 26/08 219/121.63 |
| 4,905,310 | A * | 2/1990 | Ulrich | ................. | B23K 26/1435 219/121.64 |
| 4,952,771 | A * | 8/1990 | Wrobel | .................. | A61B 18/20 219/121.67 |
| 5,059,256 | A * | 10/1991 | Kanapenas | ........... | B01D 29/111 219/121.71 |
| 5,354,414 | A * | 10/1994 | Feygin | ...................... | B22C 9/00 216/34 |
| 5,418,350 | A * | 5/1995 | Freneaux | ................ | B05B 7/228 219/121.64 |
| 5,578,228 | A * | 11/1996 | Beyer | .................. | B23K 26/073 219/121.72 |
| 5,609,781 | A * | 3/1997 | Kaga | ..................... | B23K 26/032 219/121.67 |
| 5,773,791 | A * | 6/1998 | Kuykendal | ............ | B23K 26/14 219/121.84 |
| 5,902,497 | A * | 5/1999 | Alber | .................... | B23K 26/146 219/121.63 |
| 5,902,499 | A * | 5/1999 | Richerzhagen | ........ | B23K 26/06 219/121.67 |
| 6,525,291 | B1 * | 2/2003 | Sanders | ................. | B23K 28/00 219/121.39 |
| 8,097,825 | B2 * | 1/2012 | Sato | ..................... | B23K 26/103 219/64 |
| 9,536,551 | B2 * | 1/2017 | Tokiwa | ................. | B23K 26/127 |
| 10,016,845 | B2 * | 7/2018 | Richerzhagen | ...... | B23K 26/123 |
| 2002/0034924 | A1 * | 3/2002 | Hashish | .................. | B26F 3/004 451/38 |
| 2003/0062126 | A1 * | 4/2003 | Scaggs | .................. | B23P 25/003 156/345.26 |
| 2004/0197433 | A1 * | 10/2004 | Terada | ................. | H01L 21/6708 425/174.4 |
| 2006/0102343 | A1 * | 5/2006 | Skinner | ................. | G01N 21/718 166/250.1 |
| 2006/0108341 | A1 * | 5/2006 | Alips | ..................... | B23K 26/146 219/121.84 |
| 2007/0119837 | A1 * | 5/2007 | Nishiya | ............. | H01L 21/67051 219/121.84 |
| 2007/0228025 | A1 * | 10/2007 | Horn | .................. | B23K 26/1476 219/121.78 |
| 2007/0278195 | A1 * | 12/2007 | Richerzhagen | .... | B23K 26/0665 219/121.69 |
| 2008/0169275 | A1 * | 7/2008 | Koseki | ..................... | B26F 3/004 219/121.75 |
| 2009/0045177 | A1 * | 2/2009 | Koseki | ............... | B23K 26/0643 219/121.67 |
| 2009/0084765 | A1 * | 4/2009 | Muratsubaki | ........ | B23K 26/146 219/121.67 |
| 2009/0314753 | A1 * | 12/2009 | Kosmowski | ......... | B23K 26/147 219/121.72 |
| 2010/0108648 | A1 * | 5/2010 | Koseki | .................... | B26F 3/004 219/121.67 |
| 2010/0163539 | A1 * | 7/2010 | Fukushima | ........ | B23K 26/0823 219/121.72 |
| 2010/0207038 | A1 * | 8/2010 | Sharp | .................... | B23K 26/146 250/492.1 |
| 2010/0213166 | A1 * | 8/2010 | Kray | .................... | B23K 26/146 216/37 |
| 2010/0226135 | A1 * | 9/2010 | Chen | .................... | B23K 26/146 362/318 |
| 2011/0042362 | A1 * | 2/2011 | Maehara | .............. | B23K 26/146 219/121.67 |
| 2011/0240615 | A1 * | 10/2011 | Suruceanu | ............. | B23K 26/40 219/121.71 |
| 2012/0074110 | A1 * | 3/2012 | Zediker | .............. | B23K 26/1224 219/121.72 |
| 2012/0298649 | A1 * | 11/2012 | Nagata | .................... | B23K 26/16 219/243 |
| 2013/0193617 | A1 * | 8/2013 | Zhang | .................. | C03B 33/091 264/400 |
| 2013/0206739 | A1 * | 8/2013 | Reed | .................... | B23K 26/082 219/121.71 |
| 2014/0015172 | A1 * | 1/2014 | Sidhu | ..................... | B28B 1/001 264/497 |
| 2014/0231085 | A1 * | 8/2014 | Zediker | .................. | B23K 26/12 166/288 |
| 2015/0165553 | A1 * | 6/2015 | Gaebelein | ............... | B29C 33/10 219/121.84 |

FOREIGN PATENT DOCUMENTS

JP 2013215787 A 10/2013
WO WO-2015/087209 A2 6/2015

* cited by examiner

LASER BEAM PROCESSING DEVICE COMPRISING A COUPLING DEVICE FOR COUPLING A FOCUSED LASER BEAM INTO A FLUID JET

CROSS-REFERENCE TO RELATED APPLICATIONS

This is the United States national phase of International Patent Application No. PCT/EP2016/079305, filed Nov. 30, 2016, which claims the priority benefit of Germany Application No. 10 2015 224 115.7 filed on Dec. 2, 2015. The entire contents of each of the foregoing are incorporated herein by reference.

BACKGROUND

The invention relates to a laser beam processing device according to the preamble of claim 1. Laser technology is increasingly also used for processing materials of workpieces on the surfaces thereof and is employed here for cutting, drilling, welding, marking, engraving and for surface abrasion of material on a workpiece to be processed. The advantage of laser technology consists in that virtually all materials can be processed, for example metals, metal alloys, ceramics, even diamonds including synthetic diamonds, carbon fibers, sapphire, quartz, glass, plastics and other materials. So that, within the scope of laser technology, the laser beam realizing the actual processing can carry out the processing task reliably, the laser beam has to be focused as sharply as possible so that energy for processing the workpiece is sufficiently present at the location of the processing of the workpiece. In the case of fluid-guided laser beams, a laser beam which is focused is coupled into a fluid jet which can be, and preferably is, thin like a human hair.

These fluid-jet-guided lasers are known. The actual coupling of the laser beam into the fluid jet is realized in a coupling unit. The coupling unit consists as is known of a metal chamber which is closed on the side of the focusing lens for the laser beam by means of a laser protection window. On the side opposite thereto, the chamber bears a nozzle. The fluid supplied to the coupling unit flows between the protection window and the nozzle and leaves the nozzle in the form of a fluid jet. The energy of the laser beam, which is focused on a point, is captured here in the focal plane within the fluid jet and guided to the processing location on the workpiece by means of the fluid jet. The advantage of this manner of bringing the laser beam onto the processing surface of the workpiece eliminates the necessity of precisely controlling the removal of the workpiece—with respect to the location of the nozzle for producing the fluid jet—since the energy necessary for the processing is present in the region of the entire laminar fluid jet. Any fluid having suitable light conductivity can be used here.

For said known laser beam processing devices, numerous measures for improving the performance and for improving the effectiveness of the laser beam used have been undertaken within the scope of the development and further development of said laser beam processing devices. Thus, according to EP 1 833 636 B1, a device is described for producing a fluid jet for processing materials, in which the coupling unit below the nozzle for producing the fluid jet has a passage chamber which has, downwardly in the direction of the outlet of the fluid jet from said passage chamber, a funnel-shaped tapering, into which a gas is introduced and which has a nozzle which is present at the outlet point and forms the gas flow. The gas flow at the outlet is formed by the funnel-shaped design of the passage chamber in such a manner that it envelopes the fluid jet and therefore also very substantially keeps same from fanning out. For this purpose, the passage chamber has to be under a certain positive pressure.

The enveloping gas flow is intended to reduce the friction of the fluid jet on the surrounding air in order thereby to improve the coherence of the fluid jet. So that the enveloping gas flow carries this out, the pressure and flow properties thereof can only be varied within relatively narrow limits. For displacing the fluid transported with the fluid jet onto the workpiece to be processed, the kinetic energy of said fluid jet is insufficient especially in cavities in the workpiece in which the fluid rapidly accumulates. The laser beam which is coupled into the fluid jet therefore first has to pass through fluid which is accumulated on the workpiece surface before said laser beam reaches the surface to be processed. This considerably restricts the processing capability of said laser beam on the workpiece surface.

Furthermore, WO 2015087209 A2 describes a coupling unit, in which the gas which is intended to displace the fluid on the workpiece surface is separated from the fluid jet or is spaced apart therefrom by a certain amount. Said gas jet is configured as an annular jet and envelopes the fluid jet. However, the fluid jet within the annular jet of the gas is configured as a free jet.

This is achieved in the known coupling unit by the fact that what is referred to as an insert is fitted in the coupling device, by means of which a passage chamber for the fluid jet is formed, the passage chamber being separate from a second chamber, which is arranged on the outer circumference of the insert, the pressure chamber for the gas, i.e. being separated therefrom. In the case of said known coupling device, a second gas source is furthermore provided, from which an auxiliary gas is introduced into the passage chamber for the fluid jet in a relatively small amount, at any rate in a significantly smaller amount than is required for the annular jet for displacing the fluid on the workpiece surface, the task of which auxiliary gas consists in protecting the fluid jet to a certain extent only on the surface thereof. The insert is drawn in in the manner of an aperture at its lower outlet end which is arranged opposite the nozzle in which the fluid jet is produced. A disadvantage of this known device consists in that gas particles or air particles entrained by the fluid jet, specifically in addition to the auxiliary gas, can be carried outward out of the passage chamber, and therefore it is entirely possible for a negative pressure or vacuum to arise in the passage chamber. In the event of longer operation of the coupling device, such a negative pressure can lead to the fluid jet possibly even fanning out completely, if a critical value of the negative pressure is reached in the passage chamber, and therefore its actual function being interrupted.

Furthermore, it is described according to a further exemplary embodiment in WO 2015087209 A2 that bores are provided in the insert between the feed line or the pressure chamber of the surface gas jet and the passage chamber for the fluid jet. Said bores are intended to equalize the pressure in the passage chamber with respect to the external pressure. However, said equalizing bores do not take into consideration the fact, and this aspect is also not described to some extent in this known coupling device according to this prior art, that the pressure in the passage chamber varies from the upper region, which faces the nozzle for producing the fluid jet, and the lower region, from which the fluid jet emerges. So that it can nevertheless be prevented that the fluid jet incrementally reduces the pressure in the passage space by entraining air molecules as it passes through said passage space such that a critical pressure may also be reached at which the fluid jet fans out, it is additionally provided, in the case of this known exemplary embodiment, that an auxiliary gas is introduced into the passage chamber, said auxiliary gas enveloping the fluid jet and being intended to emerge together therewith from the lower opening of the insert. Although said additional auxiliary gas may contribute to dirt not penetrating from the outside into the interior of the passage chamber, the additional auxiliary gas flow complicates the structural outlay for the coupling device and requires a relatively complex control, should the desired pressure-compensating effect be achieved at all, specifically control or regulation of the gas quantity, the gas pressure and the gas parameters of the auxiliary gas supply depending on the pressure of the annular surface gas jet.

GENERAL DESCRIPTION

These numerous attempts at optimizing the actual processing on the workpiece by means of these different known coupling devices have already led to fairly useful results in the processing of the workpieces by means of laser beam, but still have disadvantages and possibilities for improvement.

It is therefore the object of the invention to overcome the disadvantages of the devices according to the prior art and to achieve a further improvement in the effectiveness of the processing and the reliability of the coupling device.

According to a first aspect of the invention, the laser beam processing device has a coupling device for coupling a focused laser beam into a fluid jet with a defined cross section. The coupling device has a housing in which a fluid nozzle is provided which forms the fluid jet. In addition, the housing has an outlet opening through which the fluid jet which has emerged previously from and is configured by the fluid nozzle emerges from the housing. The cross section of the outlet opening is preferably larger than the cross section of the fluid jet. After the fluid jet has been formed by the fluid nozzle, it passes through a passage chamber until it emerges from the outlet opening. This means that the passage chamber is arranged between the fluid nozzle and the outlet opening in the housing. According to the invention, a pressure chamber is now provided which is acted upon with a gas. At least one throttle bore connecting the two chambers in terms of flow leads from the pressure chamber to the passage chamber. On the side of said throttle bore that faces away from the passage chamber, i.e. on the side of the pressure chamber, a pressure is present which is greater than the pressure in the passage chamber. According to the invention, the cross section of the at least one throttle bore and a resulting outlet opening cross section, which is defined from the cross section of the outlet opening reduced by the cross section of the fluid jet and which does not have any direct enveloping by a gas jet upon its outlet out of and during its passage through the passage chamber and also after its emergence from the outlet opening, are dimensioned in such a manner that no positive pressure in relation to the pressure in the pressure chamber prevails in the passage chamber. The pressure in the pressure chamber is preferably greater than the external pressure. This is significant in the event that the throttle bore is dimensioned in such a manner that no positive pressure prevails in the passage chamber in relation to the external pressure. However, it is also possible for a certain negative pressure in comparison to the external pressure to prevail in the pressure chamber because of a correspondingly provided discharging of the gas initially supplied to the pressure chamber. A corresponding overflowing of the gas from the pressure chamber into the passage chamber takes place because of the pressure which is formed in the passage chamber and which does not exceed the pressure in the pressure chamber, i.e. is not a positive pressure or a negative pressure. Each throttle bore is preferably arranged running parallel to the direction of propagation of the fluid jet. In such a case, the throttle bore realizes such an overflow from the pressure chamber into the passage chamber that a negative pressure is formed or produced there which does not exceed the pressure in the pressure chamber.

Since an overflow of the gas from the pressure chamber into the passage chamber occurs via the throttle bore under a pressure drop present because of the dimensioning, it is now provided according to the invention that the cross section of the throttle bore and also the resulting outlet opening cross section are dimensioned with respect to each other in such a manner that pressure ratios are set in the passage chamber which, even after a longer operation, a dropping of the pressure to a critical pressure, at which the fluid jet would otherwise break up, is avoided.

By means of said coordination in terms of dimensions of the cross section of the throttle bore or of the cross section of a plurality of throttle bores which are preferably present and the resulting outlet opening cross section on the housing of the coupling device, it is ensured that the fluid jet maintains such a laminar length that the coupled-in laser beam can be brought reliably to the processing point on the workpiece surface and the envisaged material removal is realized there with high effectiveness. This is possible according to the invention without a direct sheathing by an auxiliary gas or by a gas jet of annular arrangement which lies directly against the fluid jet having to be present for the fluid jet. The kinetic energy of the fluid jet is of a sufficient magnitude here that, in the case, for example, of flat or convex surfaces to be processed, the water transported to the processing point by the fluid jet or the fluid transported thereto can readily drain away, and therefore the laser which is coupled into the fluid jet can be guided directly to the processing surface without it having to penetrate a water column having a negative effect on the effectiveness of the processing.

By the diameter of the throttle bore being suitably coordinated with the resulting outlet opening cross section, or vice versa, the effect is achieved that the pressure in the passage chamber is not greater than in the pressure chamber. It is thereby ensured that no air sheathing of the fluid jet to compensate for the speed ratios between the fluid jet and its surroundings arises. The pressure equalization in the passage chamber in respect of the tendency of a resulting negative pressure due to the passage of the fluid jet and the entraining thereof of air molecules takes place automatically. The average pressure in the passage chamber is preferably slightly lower than the surrounding pressure or is at maximum equal to the surrounding pressure, but is in no way greater than the surrounding pressure in the sense of a positive pressure.

When the pressure ratios in the passage chamber are described as above, there is rather a tendency for external air or gas located on the outside to flow back into the interior of the passage chamber counter to the direction of passage of the fluid jet through the outlet opening. This is of advantage with regard to the previously described pressure equalization in the passage chamber, but has the disadvantage that, in the event of too large an outlet opening, dirt particles may be able to be conveyed into the interior of the passage space. This means that the cross section of the resulting outlet opening should not be selected to be too large. On the other hand, said outlet opening cross section should also not be selected to be too small. In a borderline case, the outlet opening cross section would be precisely the same size as the cross section of the fluid jet. In such a case, it would not be possible to prevent air molecules nevertheless being entrained with the fluid jet outward out of the passage chamber. This would ultimately lead to a reduction in pressure in the passage chamber. If the pressure reduction is of such a magnitude that a critical value for the pressure is fallen short of, there is the risk of the fluid jet disintegrating, i.e. passing from the jet form into a spray form. This has to be avoided under all circumstances because the operation of the laser beam processing device would thereby no longer be provided.

It has surprisingly now been shown that, within the scope of still relatively narrow limits, the effect can be achieved, by suitable dimensioning both of the throttle bore and of the resulting outlet opening cross section, specifically in respect of a mutual coordination of the respective cross sections, that the laminar length necessary for the processing is of a size sufficient for the fluid jet to be able to be conducted as far as possible without disturbance, and therefore in the fluid jet also for the laser beam coupled therein to be conducted to the machining surface on the workpiece. As a result, the device can operate reliably without dirt particles entering the interior of the passage chamber and that nevertheless the water striking on the workpiece surface with the fluid jet can be removed from there.

The coupling device preferably has what is referred to as an insert which separates the passage chamber from the pressure chamber—with the exception of the throttle bore connecting the two chambers. The gas acting upon the pressure chamber is preferably guided outward, preferably in the form of a gas jet of annular configuration, via a passage region which is formed between the outer side of the insert and the housing. Although said gas jet of annular configuration surrounds the fluid jet, it does not touch the latter, at least not in the region of the outlet of the fluid jet from the coupling device. Said gas jet is configured in the manner of an air jet and has such a kinetic energy that, at the processing location of the laser beam on the workpiece itself, in cavities present in the workpiece, the fluid which has accumulated there can be removed from the processing location of the laser. The separation between the passage chamber and the pressure chamber therefore affords the advantage of leaving the laminar region or the laminar length of the fluid jet undisturbed as far as possible until it strikes on the processing location on the workpiece, but equally of providing an air jet, by means of which the water present on the workpiece can be displaced, that is to say, as it were, the processing surface of the workpiece can be blown free. By means of the separation of passage chamber and pressure chamber, it is furthermore possible to adapt the respectively required parameters for the fluid, the pressure conditions in the chambers and correspondingly also for the gas for the air jet in such a manner that optimum processing results can be achieved. Since, in the case of a coupling device according to the prior art, both the air jet and the fluid jet emerge from a common nozzle which forms the air jet on the fluid jet, this independent setting and influencing of the parameters of the fluids is not readily possible there. The throttle bores or the at least one throttle bore are or is preferably oriented parallel to the longitudinal axis of the insert. However, other orientations of the throttle bores are also possible.

The resulting outlet opening cross section is preferably larger than the cross section of the at least one throttle bore; even more preferably, the resulting outlet opening cross section is approx. twice the size of the cross section of the at least one throttle bore. So that the fluid jet can pass undisturbed through the interior of the insert, which is part of the passage chamber, the diameter of the insert for the passage of the fluid jet is much greater than the diameter of the fluid jet. An aperture is preferably provided at the outlet of the insert so that there is a defined cross section which can be dimensioned in relation to the throttle bores. Said aperture-like tapering at the outlet of the insert serves to set the pressure ratios in the passage chamber in such a manner, according to the invention, that, firstly, no positive pressure occurs in relation to the pressure in the pressure chamber, but that, secondly, the opening is only of such a size that a flowing back of dirt into the passage chamber is minimized or eliminated, and the size of the aperture-like opening or of the aperture-like tapering is selected in such a manner that a corresponding pressure equalization in the passage chamber at the outlet end can be realized in the same manner as in the region of the passage chamber which is formed on the side of the fluid nozzle by the throttle bores. The diameters of the throttle bores are selected to be so small that, in addition to the throttle effect upon flowing through said throttle bores, precisely such a pressure equalization is realized that, in the passage chamber, no positive pressure prevails in relation to the pressure in the pressure chamber or the external pressure. For example, there are preferably four throttle bores, also for reasons of symmetry, which each have a diameter of 0.4 mm, i.e. are genuine throttle bores. The cross section of each individual throttle bore is therefore 0.125 mm$^2$, and therefore the entire cross section of the throttle bores totals 0.5 mm$^2$. If, by contrast, for example the resulting outlet opening lies within the diameter range of 1.2 to 1.5 mm, the associated resulting outlet opening cross section is approx. 1.1 mm$^2$ which is easily twice the size of the entire cross-sectional area of all of the throttle bores. The provision of four or two throttle bores is preferred for reasons of symmetry. The throttle bores preferably all have a cross section of identical size.

It is furthermore preferable for the outlet of the pressure chamber to be formed concentrically with respect to the outlet opening in the insert for the fluid jet and as a gas outlet nozzle. This arrangement leads to a jet shape of annular configuration for the gas, wherein the interior of this gas ring does not touch the exterior of the fluid jet, i.e. is spaced apart therefrom.

The at least one throttle bore or the plurality of throttle bores and the resulting outlet opening cross section is or are preferably dimensioned in such a manner that no negative pressure and no positive pressure prevail in relation to the external pressure in the passage chamber. Both the throttle bore and the resulting outlet opening cross section are preferably dimensioned in such a manner and the two cross sections are coordinated with each other in such a manner that a negative pressure, in particular a slight negative pressure, prevails in the passage chamber, but said negative pressure is of such a magnitude that a defined critical value is not fallen short of. A defined critical value should be understood as meaning that it is the value of the negative pressure at which the fluid jet emerging from the fluid nozzle breaks up and is configured as a spray, and consequently no longer has any laminar length. This would interrupt the operation of the laser processing device.

How rapidly said critical value is achieved during operation in the event of defective dimensioning of the cross sections of the throttle bore and of the resulting outlet opening with respect to each other depends firstly on the diameter ratios of throttle bore and the resulting outlet opening cross section, but secondly also on the parameters of the fluid and also of the air jet and the pressure ratios in the passage chamber and the pressure chamber. According to the invention, said ratios and parameters are selected in such a manner that the laser processing device can operate continuously without interruption and without malfunction until the processing task is carried out, without the device having to be switched off in-between or the processing having to be stopped at least temporarily in order optionally to set the device anew to the processing task.

A second aspect of the invention relates to a method for setting a pressure in a passage chamber for a fluid jet of a laser processing device, which passage chamber is arranged between a fluid nozzle producing the fluid jet and a housing outlet opening. The laser jet which is coupled into the fluid jet for the processing of a workpiece surface emerges together with the fluid jet from the fluid nozzle and runs together with the fluid jet through the passage chamber. In the region of the passage chamber, which points toward the fluid nozzle, a throttle bore is provided which is acted upon on its side facing away from the passage chamber with a gas in a pressure chamber, the pressure of which is greater than the pressure in the passage chamber, and is preferably greater than an external pressure outside the device. The passage chamber is delimited in relation to the fluid nozzle by an outlet opening for the fluid jet, wherein the outlet opening cross section is larger than the cross section of the fluid jet. The outlet opening cross section should be considered here to be the resulting opening cross section which arises from the outlet opening cross section, which is defined by the diameter, reduced by the cross section of the fluid jet. According to the method according to the invention, the pressure in the passage chamber is now set in such a manner that said pressure is smaller than the pressure in the pressure chamber or is at most the same size as said pressure, that is to say that there is no positive pressure in the passage chamber in relation to the pressure in the pressure chamber.

The setting of the pressure in the passage chamber can preferably also be achieved here by changing the gas pressure in the pressure chamber. It is preferably also or additionally possible for the pressure in the passage chamber to be set by changing the cross section of the throttle bore and/or of the outlet opening cross section. In particular, the pressure in the passage chamber can be set by changing the relation of the cross section of the throttle bore to the outlet opening cross section.

However, it is also possible for the pressure in the passage chamber to preferably be set by changing the viscosity of the gas in the pressure chamber.

The pressure in the passage chamber is preferably set in such a manner that a positive pressure in relation to the external pressure does not arise, and that furthermore preferably also a negative pressure in relation to the external pressure does not arise, and therefore external pressure substantially prevails in the passage chamber.

Furthermore preferably, the pressure in the passage chamber is set via the relation of the cross sections of the throttle bore and the resulting outlet opening and/or the viscosity of the gas in the pressure chamber and also by changing the pressure of the gas in the pressure chamber in such a manner that a defined critical value of the negative pressure is not fallen short of in the passage chamber. This is particularly of importance because, in the event of too low a pressure in the passage chamber, the fluid jet can pass from its laminar jet behavior into a spray form, as a result of which processing of the workpiece surface is entirely impossible.

It is particularly advantageous if the pressure in the passage chamber is regulated in a device as has been previously described.

BRIEF DESCRIPTION OF THE DRAWINGS

Further advantages, use possibilities and details of the present invention will now become clear with reference to the description of the figures. In the drawing.

DETAILED DESCRIPTION

Figure 1:
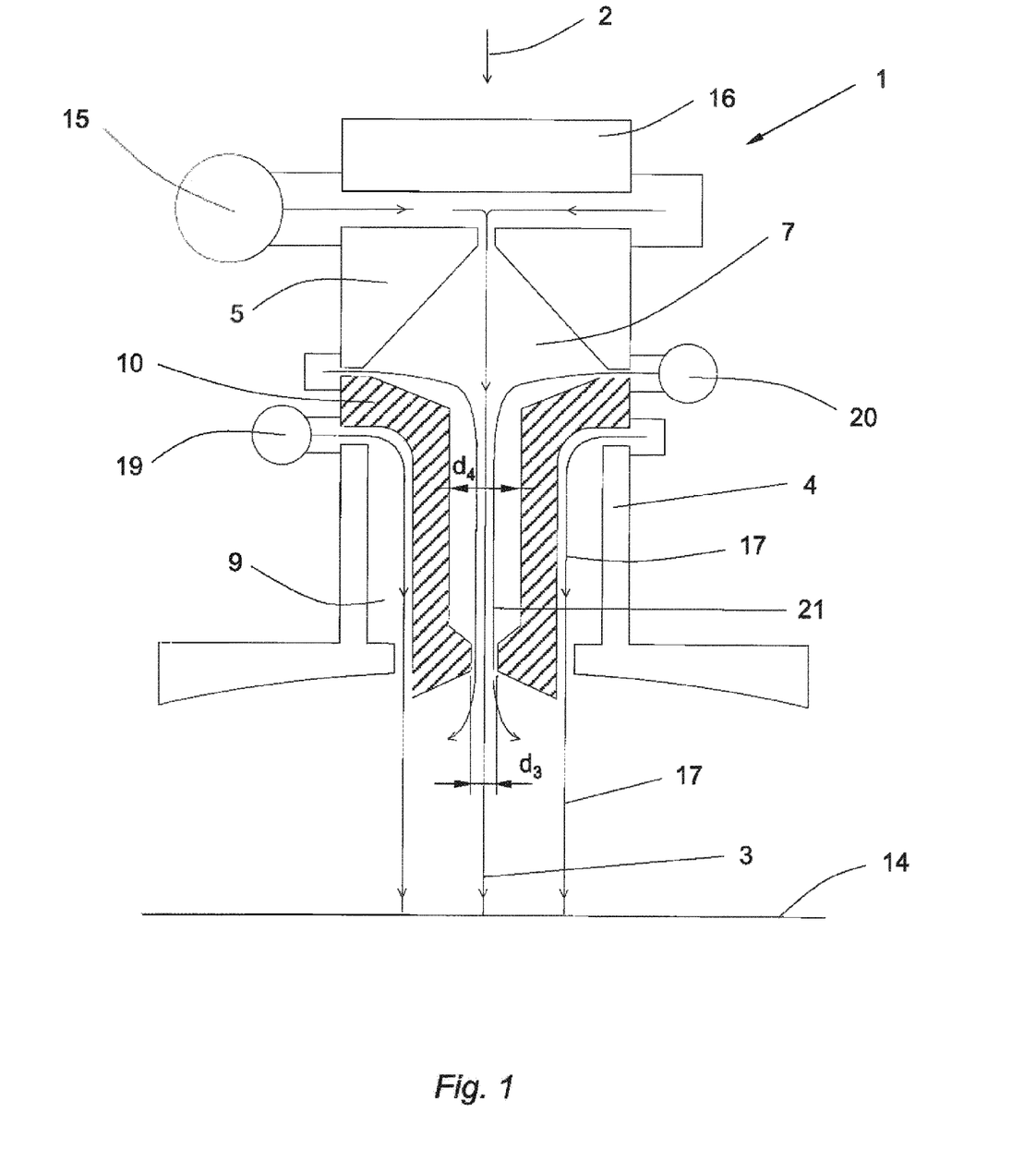
FIG. 1 shows a simplified schematic view of a coupling device for a laser beam processing device according to the prior art.

The coupling device, which is illustrated in FIG. 1, according to the prior art serves for a laser beam processing device, wherein FIG. 1 shows a workpiece surface 14 on which a fluid jet 3 with a laser beam 2 coupled therein strikes for the processing thereof. A protection window 16 is provided in order to separate the dry portion of a laser beam 2 and the fluid portion of a fluid jet 3. A lens (not illustrated) serves to focus the laser beam 2 on the fluid jet. A fluid nozzle 5 is functionally coupled to the protection window 16 leaving a gap for receiving a fluid, e.g. water, from a fluid source or fluid chamber 15. The nozzle 5 has an opening through which the fluid emerges as a fluid jet 3. The nozzle 5 opens in the direction of a passage chamber 7 which serves inter alia for improving the laminar flow of the fluid jet 3. An auxiliary gas flow 21 is supplied from a gas source 20 into the passage chamber via a separate feed line. The auxiliary gas flows in the direction of the fluid jet 3 and sheaths the latter until it emerges from the passage chamber 7. An insert 10 is provided below the nozzle 5, the insert downwardly closing the passage chamber 7 and guiding the fluid jet 3 in the interior. The insert 10 is configured in such a manner that a pressure chamber 9 is formed on its exterior, the pressure chamber serving for forming an air jet or a gas jet 17 and being acted upon in a corresponding manner with this gas from a gas source 19. At the outlet of the housing 4 of the coupling device 1, an annular gap is formed around the lower, protruding end of the insert 10, via which a circular ring-shaped air jet 17 emerges and surrounds the fluid jet at a distance. The air jet 17 is formed parallel here to the fluid jet 14. In the case of this known coupling device, the insert has a physical separation between the gas jet or air jet 17 and the fluid jet 13. This means that the fluid jet 3 and the gas jet 17 leave the coupling device through two different nozzle openings which are separate from each other. By means of the physical separation of the fluid jet from the gas jet, it is possible for an independent control of the gas jet 17 conducted onto the workpiece surface to be conducted, i.e. the parameters of the gas jet can be controlled independently of those of the fluid jet 3. This relates in particular to the pressure and the volumetric flow, and therefore very good conditions for displacing the water present on the workpiece surface or accumulating there can be provided, specifically in such a manner that the gas jet 17 does not enter into negative interaction with the fluid jet 3, into the interior of which the laser jet is coupled for machining the workpiece surface 14. The outer sheath-like surface of the insert 10 extends parallel to the passage direction of the fluid jet 3 in the interior of the insert such that the gas jet, which is configured as an annular jet, runs parallel to the fluid jet 3.

The passage space 7 in the interior of the coupling device has, in the interior of the insert, a diameter or a cross section which is larger than the direct outlet cross section of the insert through which the fluid jet leaves the insert—sheathed with the auxiliary gas supplied from the gas source. The aperture-like diameter $d_3$ of the outlet opening of the insert is significantly smaller than the inside diameter $d_4$ of the insert with this part, configured there, of the passage chamber 7.

This known coupling device is intended to ensure sheathing of the fluid jet 3 by means of the auxiliary gas, which is introduced in addition to the gas jet 17 into the interior of the passage chamber 7 and the interior of the insert 10 and originates from the gas source 20, so that the fluid jet conveys as few as possible if any air molecules on its surface from the passage chamber 7 into the exterior and at the same time is not disadvantageously influenced in relation to the substantially stationary air otherwise surrounding the fluid jet. For this purpose, however, an increased structural outlay for an additional gas source 20 with the corresponding lines, feed lines and insertions into the interior of the coupling device 1, i.e. the interior of the passage chamber 7, is required.

Figure 2:
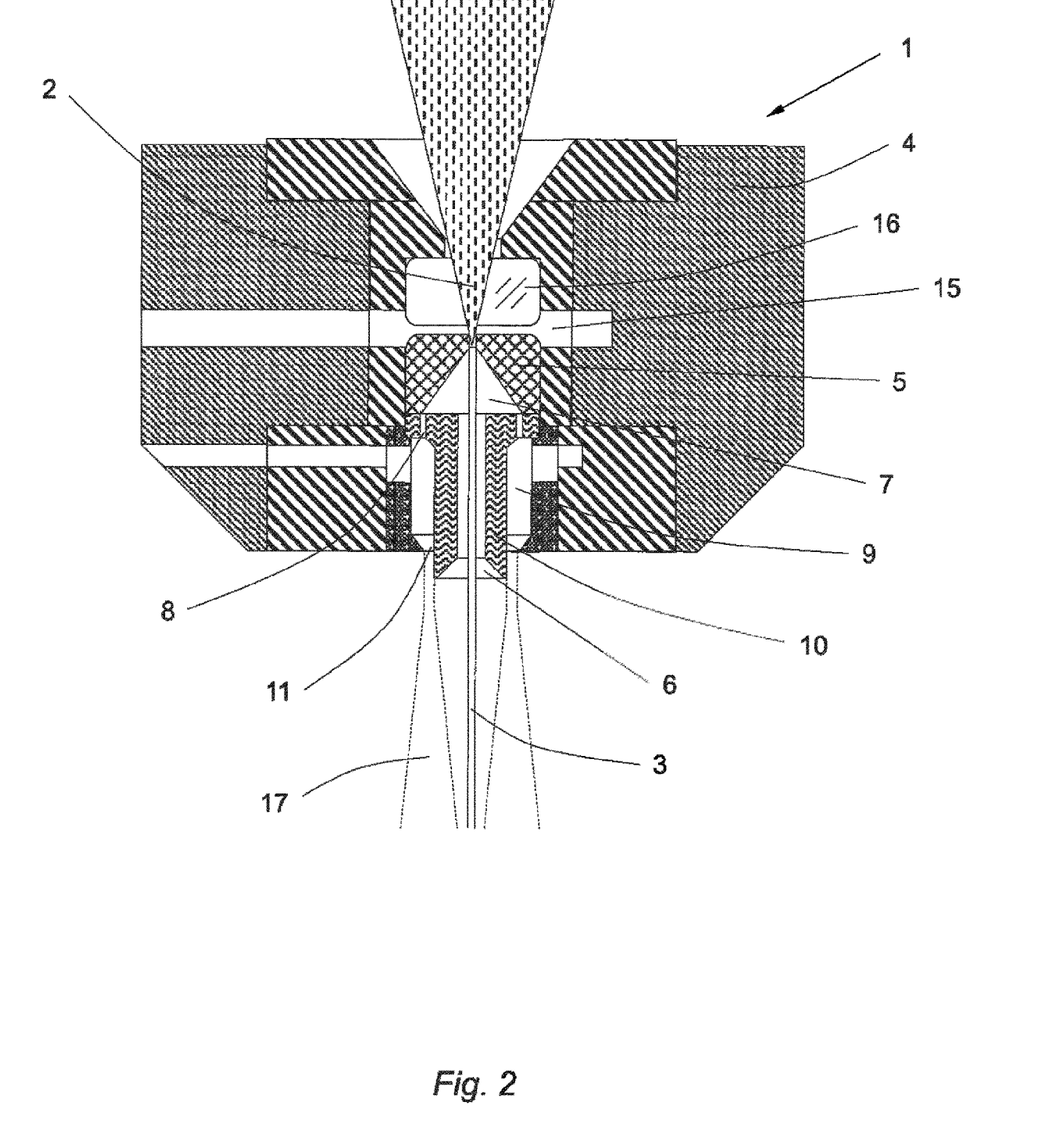
FIG. 2 shows a schematic section view of a coupling device according to the invention.

FIG. 2 illustrates a coupling device 1 according to the invention which avoids the disadvantages of the prior art. In a manner known per se, said coupling device 1 according to a first exemplary embodiment has a housing 4 in which a protection window 16 is provided above a fluid nozzle 5. An intermediate space is provided between the protection window 16 and the fluid nozzle 5, into which intermediate space the fluid, preferably water, is supplied in order to emerge via the fluid nozzle 5 as a fluid jet 3 into the passage chamber 7 below the fluid nozzle 5. A laser beam converging by means of a lens (not illustrated) is inserted into the coupling device 1 in such a manner that the focus thereof lies directly in the fluid nozzle 5 and is coupled as a focused laser beam into the fluid jet 3 in the fluid nozzle 5. Below the fluid nozzle 5, an insert 10 is provided in the interior of the housing 4 of the coupling device 1, the insert separating the passage chamber 7 for the water jet from a pressure chamber 9, which is arranged around the outer sheath surface of the insert 10, for a gas jet 17, which is also referred to as an air jet. The insert 10 projects in relation to the housing and the outer sheath surface of the insert 10 through a gas outlet nozzle 11, and therefore the latter is configured as an annular nozzle around the outer sheath surface of the insert. The pressure chamber 9 is acted upon via a supply of gas, preferably supply of air, inserted into the housing. The gas jet 17, which is of annular configuration, is provided to strike on the workpiece surface (not illustrated in FIG. 2) and there to displace the water conveyed with the fluid jet 3 onto said workpiece surface or the conveyed fluid such that the fluid jet with the laser beam does not first have to penetrate a fluid wall or a fluid layer before the laser beam can pass to the location for the processing of the workpiece surface.

An outlet opening 6, which corresponds in FIG. 2 to the inner diameter of the insert for the fluid jet 3, is provided at the lower outlet end of the insert 10. Said inner diameter of the insert is configured to be significantly larger than the fluid jet 3 itself, which is configured to be hair thin. A collar-like flange, in which throttle bores 8 are present, is provided in the upper region, pointing toward the fluid nozzle 5, of the insert 10. The throttle bores 8 have a very small diameter, i.e. a very small cross-sectional area, and connect the pressure chamber 9 to the passage chamber 7. In this exemplary embodiment, the throttle bores are oriented parallel to the longitudinal axis of the insert.

During operation of the laser beam processing device, the fluid jet, which emerges at high speed from the fluid nozzle 5 and is conducted through the passage chamber 7, continuously entrains air molecules. Despite the laminarity of the fluid jet, the latter has a certain roughness on its surface, as a result of which the air molecules are entrained. During the operation, it may therefore happen that the pressure in the passage chamber 7 drops due to the discharge of air molecules. If the pressure reaches a defined critical value here, i.e. a negative pressure, there is the risk of the fluid jet fanning out, i.e. merging into a spray-like form, which is also referred to as a critical jet evaporation point. In this exemplary embodiment according to the invention of the coupling device 1 in the collar-like flange of the insert, the formation of throttle bores 8 is therefore provided. Said throttle bores make it possible to equalize the possibly resulting negative pressure in the passage chamber 7 in relation to the gas pressure in the pressure chamber 9. The relatively large diameter of the inner passage region of the insert 10, which extends as far as the outlet opening 6 for the fluid jet 3, equally serves to provide for a certain pressure equalization at any rate at the outlet region from the passage chamber 7. However, said larger diameter has the disadvantage that, during a possible flow back into the interior of the passage chamber 7, dirt particles are conveyed in at the same time which may accumulate on the nozzle and therefore, after a certain operating time, lead to an interruption in the reliable operation of the coupling device and require cleaning of the latter. The gas jet 17 which emerges via the annular gas outlet nozzle 11 is spaced apart from the fluid jet 3, and, although it surrounds the latter annularly, it initially does not have any direct contact with the fluid jet. The gas jet 17 serves to displace the fluid conveyed with the fluid jet 3 onto the workpiece surface, which is not illustrated in FIG. 2, and therefore the laser beam 2 which is coupled into the fluid jet 3 can strike directly and without obstruction against the workpiece surface. Above all, the annular gas jet 17 also serves to displace fluid which possibly accumulates in a cavity present in the workpiece surface, and therefore the device according to the invention can also be used to process workpiece surfaces which lie within a cavity and which would only be able to be processed to a limited extent at most without a gas jet for displacing said fluid.

According to the invention, the passage cross section of the throttle bores 8 is now dimensioned relative to the cross section of the outlet opening 6 and therefore of the passage region of the fluid jet 3 by the insert according to this exemplary embodiment. This dimensioning is carried out in such a manner that the outlet opening cross section of the outlet opening 6 is larger than the cross section of the throttle bores. Said cross section is preferably twice the size of that of the throttle bores. As the outlet opening cross section, the resulting outlet opening cross section which arises from the cross section of the inner diameter of the insert 10 reduced by the cross section of the fluid jet 3 is appropriate here for the dimensioning.

Figure 3:
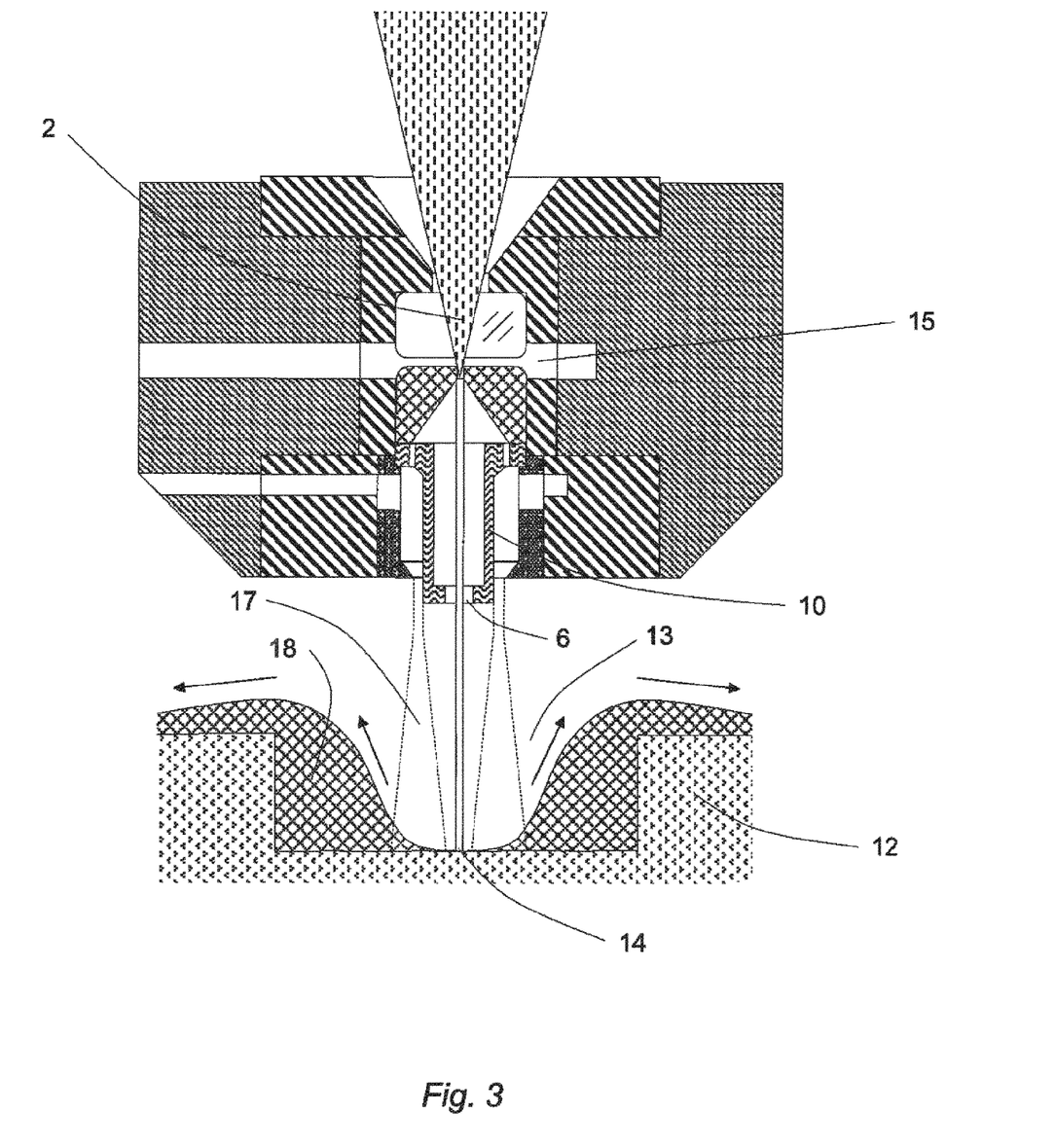
FIG. 3 shows a coupling device according to the invention according to FIG. 2 during the processing of a workpiece surface in a cavity.

FIG. 3 shows a further exemplary embodiment of a coupling device 1 according to the invention in which the striking of the fluid jet, into which the laser beam 2 is coupled, is directed onto a workpiece surface 14 of a workpiece 12 and strikes there, specifically without the fluid jet 3 having to penetrate through a fluid column because the gas jet 17 strikes against the fluid collecting in the cavity 13 and removes the fluid 18, which is to be displaced, outward over the edge of the cavity. This ensures that the fluid jet strikes directly on the workpiece surface 14, which is to be processed, at the bottom of the cavity. The basic design of the coupling device 1 is very similar to that according to FIG. 2, and therefore the individual components will not be explained once again here. In contrast to FIG. 2, the insert 10, which is provided in this exemplary embodiment, is provided with an outlet opening 6 which is reduced in relation to the inner passage diameter. Said outlet opening 6 is configured in the form of an aperture-like constriction or an aperture-like tapering and ensures that the outlet opening 6 is specifically of such a size that the fluid jet can readily leave the interior of the passage chamber 7 without sheathing with a gas jet, but too great a flow of external air or external gas back through the outlet opening 6 into the interior of the passage chamber 7 is minimized because of a negative pressure which may be formed. This prevents or at least greatly reduces dirt particles entering the interior of the passage chamber 7.

The dimensioning of the cross sections of the throttle bores and of the resulting outlet opening cross section 6 takes place in such a manner that the pressure in the passage chamber is formed as uniformly as possible and has such a value that, in the passage chamber 7, there is either no positive pressure in relation to the external pressure or at least no positive pressure in relation to the pressure in the pressure chamber 9. With the coupling device 1 according to the invention, it is thereby prevented that, even during longer operation, a negative pressure is formed in the passage chamber 7 that is in the vicinity of a critical negative pressure, from which the fluid jet breaks up and becomes a spray, as a result of which the operation of the coupling device would no longer be ensured. This specifically does not occur in the case of the coupling device according to the invention, specifically without, as is provided in the prior art, an additional auxiliary gas directly enclosing the fluid jet together with corresponding lines, pressure containers, etc., having to be provided. The coupling device according to FIG. 3 is structurally particularly advantageous and simple in comparison to that according to the prior art.

Figures 4A, 4B:
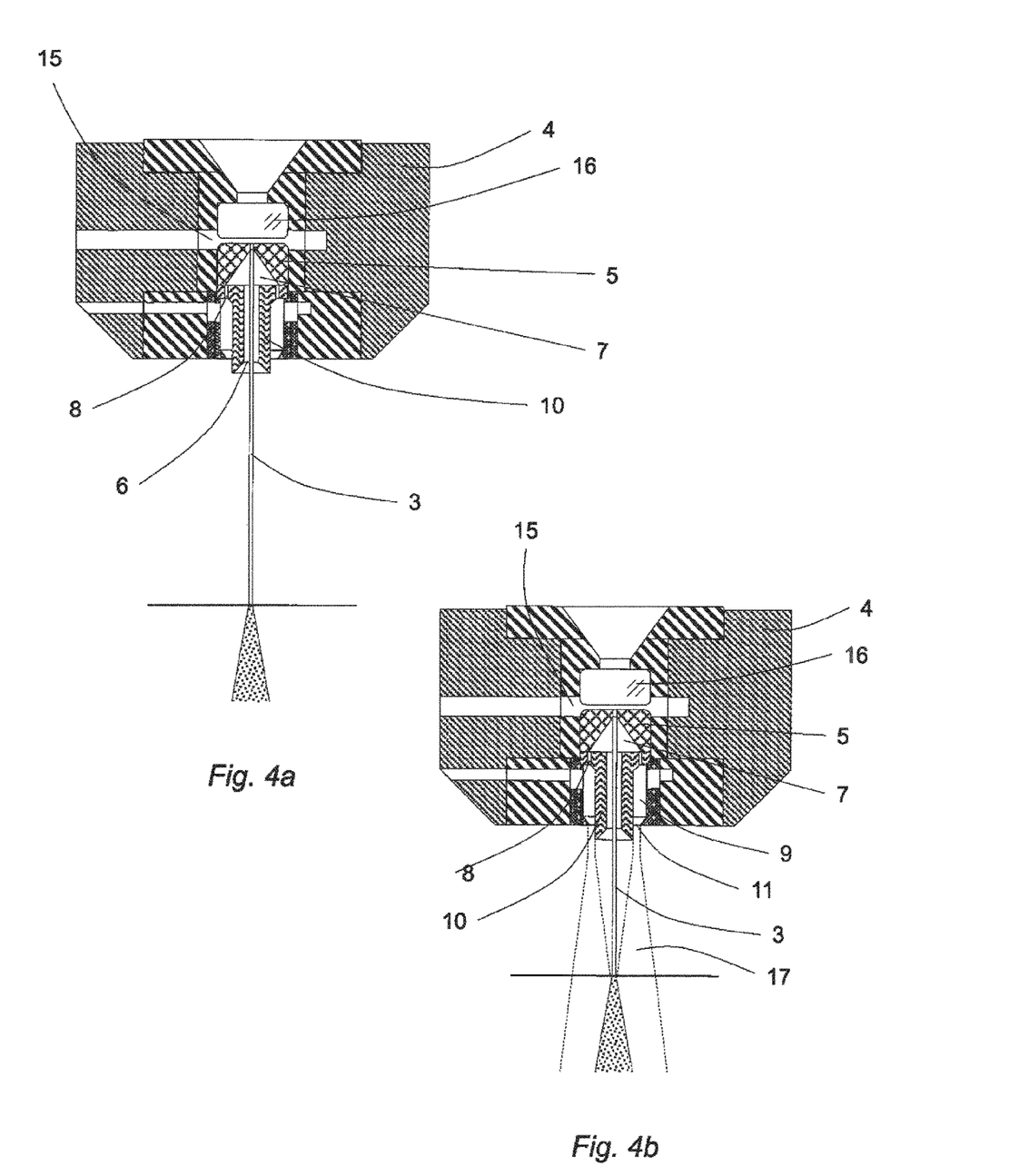
FIG. 4a) shows the coupling device according to the invention according to FIG. 2, but without an air jet and with a longer laminar length of the fluid jet.
FIG. 4b) shows the coupling device according to the invention according to FIG. 2 with a shorter laminar length of the fluid jet and an air jet.

FIG. 4a) illustrates a coupling device according to FIG. 3, specifically without a gas jet 17 having to be provided. Such an arrangement is possible above all if the workpiece surface to be processed is either convex or at least flat at the processing point from where the water conveyed with the fluid jet to the processing point or the conveyed fluid can flow away. The advantage of processing a workpiece surface with a laser beam 2 coupled in a fluid jet 3 consists in that the laminar length of the fluid jet is greater than if an annular gas jet is present, as is illustrated in FIG. 4b).

In FIG. 4a), the insert—similarly as in the exemplary embodiment according to FIG. 3—has, in the upper collar region, throttle bores 8 which connect the passage space 7 to the pressure chamber 9 in which external pressure prevails in the present exemplary embodiment. The fluid for the fluid jet 3 passes via a feed line and a fluid chamber 15 to the fluid nozzle 5 from which the fluid jet emerges and in which the laser beam 2 is coupled via a protection window 16.

FIG. 4b) illustrates a coupling device according to FIG. 4a), in which, however, a gas jet is additionally conveyed into the pressure chamber 9, said gas jet emerging from the pressure chamber in the form of a gas jet 17 of annular configuration from the coupling device 1. The remaining design corresponds to that according to FIG. 4a). Since the annular gas jet after emerging from the annular gas outlet nozzle fans open relatively rapidly, after a defined distance the annular gas jet touches the fluid jet. From this point, the fluid jet 3 is disturbed in respect of its laminarity, and the fluid jet 3 fans out. This is also referred to as an atomization point for the fluid jet 3. It becomes clear from FIGS. 4a) and 4b) that the annular gas jet does indeed have the advantage of displacing fluid accumulating in a cavity of a workpiece to be processed so that the fluid jet can reliably pass with the laser beam directly onto the processing point. However, because of its fanning out, the annular gas jet reduces the laminar length of the fluid jet after the latter has emerged from the outlet opening 6 at the lower end of the insert 10.

In the case of the exemplary embodiment according to FIG. 4a), the laminar length of the fluid jet is particularly large and is, for example, approx. 50 mm. By contrast, the laminar length in the case of the exemplary embodiment according to FIG. 4b) is smaller and is, for example, 30 to 35 mm. However, in both cases, said laminar length is sufficient because the distance between the outlet of the fluid jet and workpiece surface is generally approx. 20 mm. In the case of the exemplary embodiment according to FIG. 4b), a further advantage consists in that the annular air jet has a good protective effect for the fluid jet and therefore the laser beam coupled therein as far as the atomization point. This is of importance, for example, if the laser beam machining device is moved together with the coupling device over the workpiece surface during the processing and the protective effect of the air jet prevents the fluid jet with the laser beam coupled therein from being deflected or deformed.

Figure 5:
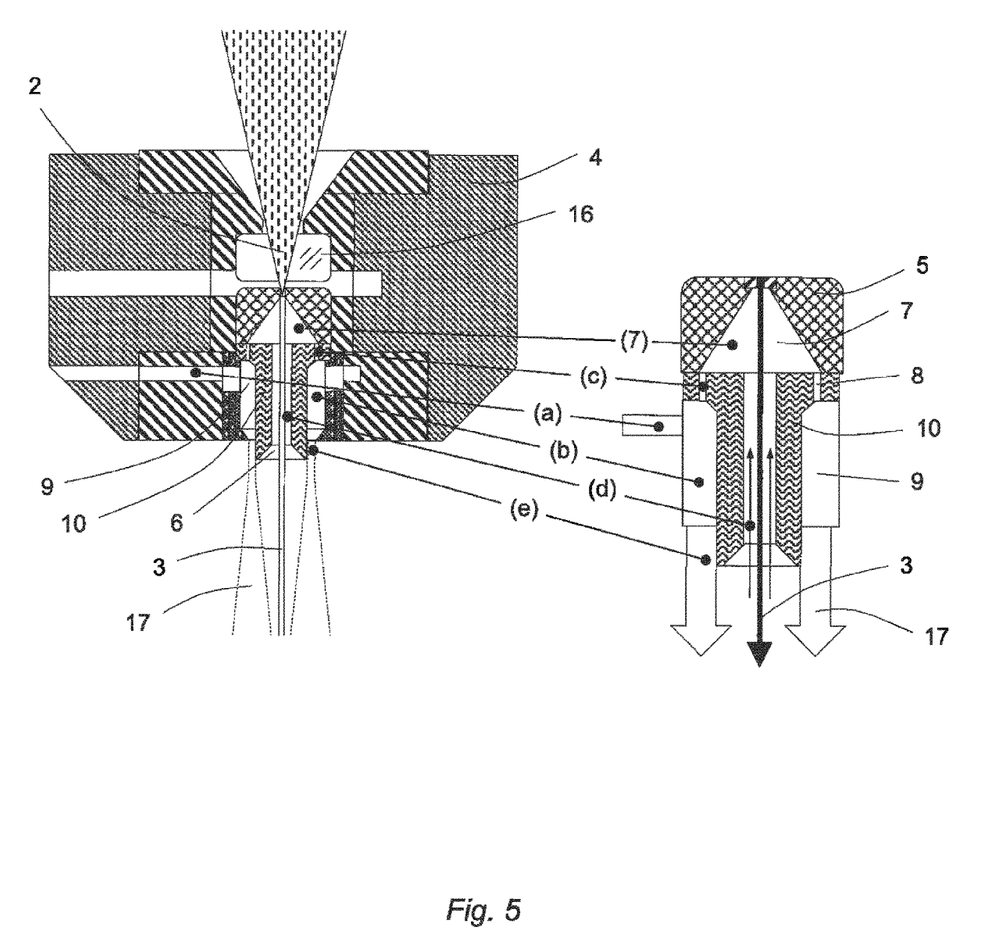
FIG. 5 shows the coupling device according to the invention according to FIG. 2 with an enlarged illustration of fluid nozzles and insert with indication of the fluid flows.

Finally, FIG. 5 illustrates a coupling device 1 according to the invention according to FIG. 2, in which, in the enlarged illustration of the detail for the region of fluid nozzle 5, passage space 7 and insert 10, the pressure and flow conditions are indicated. All remaining elements or components correspond to those according to FIG. 2 or else FIG. 3, and therefore this is not discussed again here. In the figure, the letters placed between parentheses mean the following:
(a) gas/air supply with the cross section A1 and the pressure p1,
(b) pressure space with cross section A2 and pressure p2 in the form of a storage space,
(c) throttle bore for equalizing the pressure between passage space 7 for the water jet 3 and the pressure chamber 9 with the cross section A3 and the pressure p3,
(d) outlet opening for the fluid jet from the insert with the cross section A4 and the pressure p4, and
(e) output of the annular gas jet 17 from the gas outlet nozzle 11 with the cross section A5 and the pressure p5.

For the dimensioning, it now is applicable that A1<A2>A3<A4 and in particular A5>A1. With regard to the pressures, p1>p2<p5. The air flow builds up as follows: the gas or the air flows via the feed line into the pressure chamber 9. The pressure chamber 9 is not a pressure accumulator since the output cross section, which is configured as an annular gap, for the gas is always larger than the cross section of the feed line for the gas or for the air. In particular, the output cross section is double the size of the cross section of the throttle bores 8. The passage space 7 for the fluid jet 3 has a resulting output cross section A4 which is larger than the cross section of the throttle bores A3. As a result, a positive pressure does not arise in the passage space 7. As a result, no air sheathing or gas sheathing to equalize the speed ratios between the fluid jet 3 and its surroundings arises either. On account of this configuration according to the invention of the insert with a defined output cross section 5 and the throttle bores 8, the pressure equalization with a negative pressure otherwise forming in the passage chamber 7 takes place automatically. The average pressure level in the passage space 7 is smaller than or at maximum equal to the external pressure. In many cases, this can be the ambient pressure. However, it is also conceivable for the device according to the invention to be encapsulated and to operate under pressure, wherein a gas may also be used instead of air depending on the requirement conditions.

Via the dimensioning and the control of the pressure, the temperature and the viscosity of the fluids used, it is therefore possible to regulate the pressure in the passage space 7 of the coupling device according to the invention such that a continuous, permanent and reliable operation of the laser beam processing device can be ensured, wherein the outlay on apparatus is kept lower in comparison to that according to the prior art.

The invention claimed is:

1. A laser beam processing device comprising a fluid nozzle producing a fluid jet, a coupling device (1) for coupling a laser beam (2), which is focused with a lens, into the fluid jet (3) of a defined cross section a gas supply is provided having a flow cross section A1 and, in the event of a gas pressure is present at the supply, a pressure p1;
   a pressure chamber for the gas in form of a retaining capacity is provided having a flow cross section A2 and, in the event of a gas pressure is present at the supply, a pressure p2;
   an annular outlet for the gas is provided having a flow cross section A5 and in the event of a gas pressure is present at the supply, a pressure p5;
   wherein the fluid nozzle (5) for forming the fluid jet (3) is arranged in a housing (4); and
   an outlet opening (6) having a flow cross section A4 which is arranged in the housing (4) is provided through which the fluid jet (3) emerges from the housing (4) and the cross section of which is larger than the cross section of the fluid jet (3); and
   a passage chamber (7) for the fluid jet (3), which is arranged between the fluid nozzle (5) and the outlet opening (6);
   characterized in that
   at least one throttle bore (8) which is fluidly connected to the passage chamber (7) and has a flow cross section A3 that, in the event of the gas pressure of the supply of gas that is present on the side of said throttle bore that faces away from the passage chamber being greater than in the passage chamber (7), wherein A2 is larger than A1, A2 is larger than A3, A4 is larger than A3 and a resulting outlet opening cross section, which is formed from the cross section of the outlet opening (6) configured as an aperture reduced by the cross section of the fluid jet (3) with respect to the throttle bore (8) and an output cross section A11 formed at the emergence of the gas from the pressure chamber (9) at the end lying opposite the throttle bore (8) are dimensioned with respect to each other in such a manner that p1 is larger than p2, and p5 is larger than p2.

2. The device as claimed in claim 1, characterized in that the gas emerges from the housing (4) via a passage region, which is separated off from the passage chamber (7) by means of an insert (10) arranged in the housing (4), outside the outlet opening (6) and surrounding the fluid jet (3) in the manner of an air jet.

3. The device as claimed in claim 1, characterized in that the resulting outlet opening cross section $A_6$ is double the size of the cross section $A_8$ of the at least one throttle bore (8).

4. The device as claimed in claim 1, characterized in that there are four throttle bores (8) of identical cross section.

5. The device as claimed in claim 2, characterized in that the pressure chamber (9) has a gas outlet nozzle (11) configured concentrically with respect to the outlet opening (6) in the insert (10).

* * * * *